US006948576B2

(12) United States Patent
Angeles

(10) Patent No.: US 6,948,576 B2
(45) Date of Patent: Sep. 27, 2005

(54) DRIVING AND TRANSMISSION UNIT FOR USE IN ROLLING VEHICLES

(76) Inventor: Jorge Angeles, 4476 Ste.-Catherine St. W. Apt. 104, Westmount, Quebec (CA), H37 1R7

( * ) Notice: Subject to any disclaimer, the term of this patent is extended or adjusted under 35 U.S.C. 154(b) by 115 days.

(21) Appl. No.: 10/339,755

(22) Filed: Jan. 9, 2003

(65) Prior Publication Data

US 2003/0127260 A1 Jul. 10, 2003

Related U.S. Application Data

(60) Provisional application No. 60/346,617, filed on Jan. 10, 2002.

(51) Int. Cl.[7] .............................................. B62D 61/10
(52) U.S. Cl. ........................ 180/23; 180/6.48; 180/6.64; 180/24.07; 180/65.6
(58) Field of Search ................................. 180/6.48, 6.5, 180/6.58, 6.64, 23, 24.07, 24.08, 65.6, 348, 252

(56) References Cited

U.S. PATENT DOCUMENTS

| 4,221,273 A | * | 9/1980 | Finden ....................... 180/6.48 |
| 4,463,821 A | * | 8/1984 | Falamak ...................... 180/168 |
| 4,657,104 A | * | 4/1987 | Holland ....................... 180/211 |
| 4,683,973 A | * | 8/1987 | Honjo et al. ................. 180/252 |
| 4,917,200 A | * | 4/1990 | Lucius ........................ 180/6.2 |
| 5,186,270 A | | 2/1993 | West .......................... 180/6.62 |
| 5,374,879 A | | 12/1994 | Pin et al. ..................... 318/139 |
| 5,576,947 A | | 11/1996 | Wienkop ...................... 700/56 |
| 5,927,423 A | | 7/1999 | Wada et al. ................. 180/209 |
| 6,020,875 A | * | 2/2000 | Moore et al. ................ 345/156 |
| 6,408,230 B2 | * | 6/2002 | Wada ............................ 701/1 |
| 6,715,845 B2 | * | 4/2004 | Kamen et al. .......... 301/111.03 |
| 2001/0008985 A1 | | 7/2001 | Wada ............................ 701/1 |

FOREIGN PATENT DOCUMENTS

| DE | 822660 | 8/1949 |
| WO | WO 98/12498 | 3/1998 |

OTHER PUBLICATIONS

Seet et al., "Autonomous Mobile Robot for Hospitals", Journal of Robotics and Mechatronics 1995 7(3):263–269.

* cited by examiner

Primary Examiner—Paul N. Dickson
Assistant Examiner—Toan C To
(74) Attorney, Agent, or Firm—Licata & Tyrrell P.C.

(57) ABSTRACT

A driving unit for use with a rolling vehicle is provided containing a first and second motor mechanically coupled to two wheels via a transmission unit which is pivotable about the steering axis of the driving unit and adapted to establish a driving relationship between the first motor and one wheel of the unit and for establishing a driving relationship between the second motor and a second wheel of the unit. The coupling between the first motor and second motor and the transmission unit allows the transmission unit to pivot about the steering axis without causing a corresponding pivotal movement of the platform on which the first motor and the second motor are fixedly mounted, while allowing the first motor and the second motor to transmit power to their respective wheels. Various transmission units for use in these driving units are provided as well as rolling vehicles containing such units.

8 Claims, 4 Drawing Sheets

DRIVING AND TRANSMISSION UNIT FOR USE IN ROLLING VEHICLES

This application claims the benefit of priority from U.S. Provisional Application Ser. No. 60/346,617, filed Jan. 10, 2002, which is herein incorporated by reference in its entirety.

FIELD OF THE INVENTION

The present invention relates generally to driving units for vehicles rolling on flat surfaces and, more particularly, to rolling vehicles having at least two such driving units and operating under computer control. The latter are known as rolling mobile robots or wheeled mobile robots. The driving units of the present invention are particularly useful in terrestrial vehicles, wheeled robots and moving platforms under computer control, amongst others.

BACKGROUND OF THE INVENTION

Transmission mechanisms for rolling vehicles under unmanned operation have been under development since the early automatic guided vehicles (AGV). Mechanism morphology varies, depending on the class of wheels, which can be conventional or omnidirectional. A conventional wheel is one with a simple disk geometry; omnidirectional wheels are of various types, notably Mekanum wheels, as disclosed in German Patent 822,660, Class 63d, Group 1, of Jul. 8, 1949 to Fuchs, consisting of a drum on whose periphery a plurality of idle rollers are located, with axes skewed with respect to the axis of the drum. An alternative class of omnidirectional wheels comprises ball wheels, as disclosed in U.S. Pat. No. 5,186,270 of Feb. 16, 1993 to West; U.S. Pat. No. 5,374,879 of Dec. 20, 1994 to Pin et al.; and U.S. Pat. No. 5,927,423 of Jul. 27, 1999 to Wada et al. The contents of the above documents are hereby incorporated by reference in their entirety.

Transmissions for conventional wheels can be of two kinds, depending on whether the axis of the wheel is fixed or articulated to the vehicle chassis. Fixed-axis wheels are restricted to vehicles with a mobility of two. This is identical to the mobility of manned terrestrial vehicles. Articulated wheels offer the possibility of a mobility of three, or full mobility, which thus allows for the driving of a platform arbitrarily on a flat floor, with two independent translations, in the x- and y-directions, plus a rotation in the plane, commonly referred to as the θ-motion.

Articulated wheels can be either idle or actuated. Articulated idle wheels have an offset between the steering and the driving axes. Articulated actuated wheels make use of two motors for their actuation, one for the steering and one for the driving, but can be either centered or offset, depending on whether the steering and the driving axes intersect or not. Offset wheels are termed caster (or castor) wheels.

Caster wheels are common in applications not requiring an actuated wheel, such as in trolleys, the offset providing for a turning moment that allows the suitable reorientation of the wheel axis, as needed for pure rolling. Applications requiring the actuation of the wheel permit the use of centered wheels, provided that the wheel axis is steerable by means of a motor.

Caster wheels are commonly used in the case of steerable wheels. For example, U.S. Pat. No. 5,576,947, dated Nov. 19, 1996 and issued to Wienkop, describes a wheel of the offset type, further developed in WO9812498 Patent, of Mar. 26, 1998 to Legrand and Slater. A modification of this layout is disclosed in U.S. published patent application 20010008985, of Jul. 19, 2001 to Wada. The contents of the above documents are herein incorporated by reference in their entirety. The aforementioned documents describe an actuation unit with one single wheel, which is both steerable and driveable by means of two identical motors of vertical axes. The steering and driving motions are transmitted to the wheel with the aid of one mechanism involving bevel gears with straight teeth, intended for the driving of the wheel about a horizontal axis. The wheel of U.S. Pat. No. 5,576,947 and PCT application WO9812498 has its axis of rolling offset with respect to the vertical axis of steering, while the wheel of U.S. published patent application 20010008985 bears one additional offset, that of the wheel plane, from the same steering axis.

Deficiencies of transmissions of the type described above are to be noted: a) the unnecessary single or double offset contributes to the complexity of the control of the overall vehicle; b) one of the two identical motors is dedicated to the steering, the other to the driving, thereby performing two quite disparate functions that require disparate control strategies, i.e., position control vs. velocity control; c) the offset prevents the reorientation of the wheel while the vehicle (rolling robot) is stationary, thereby transmitting to the vehicle a parasitic motion upon reorientation; and d) bevel gear trains with straight teeth are noisy, while their counterparts with spiral teeth, capable of a smoother operation, are more expensive, which makes them less common in the art.

An alternative layout of a transmission includes a two-wheel unit, with the two wheels mounted coaxially, but turning at independent rates. A system of this type is described in Carnegie-Mellon University's Pluto, developed by Hans Moravec, as reported in the Proceedings of the 1983 ASME Conference on Computers in Engineering, Las Vegas. Pluto is a rolling robot with three actuation units, each supplied with two identical motors to both steer the common axis of the wheels and drive one of the two wheels, the second wheel being idle. This transmission is different from that of U.S. Pat. No. 5,576,947, PCT Application WO9812498 and U.S. published patent application 20010008985, in that the motors with their speed reducers do not drive their assigned axes directly, but via a differential mechanism, which is made of bevel gears.

Deficiencies of the above described alternate transmission are to be noted: a) the two identical motors are intended for two disparate functions, steering and driving; b) bevel gears entail the shortcomings mentioned above; c) the driving of one single wheel limits the load-carrying capacity of the unit to one-half that provided by the two motors; and d) the driving of one single wheel implies uneven loading, which leads to uneven wear of the motors.

In yet another alternative layout of a transmission a two-wheel unit has each of its two identical motors driving each of the two wheels with its own transmission. This type of transmission is described in a technical paper in the Journal of Robotics and Mechatronics, Vol. 7, No. 3, 1995. A transmission of this type is intended to convert a rotation about the vertical axis of the motor into a rotation about the horizontal axis of symmetry of the wheels. This conversion is implemented by means of a worm-gear transmission, which works under friction, and hence, impacts on the efficiency of the device.

Consequently, there is a need in the industry for providing a transmission that alleviates, at least in part, the deficiencies associated with prior-art dual-drive transmissions.

SUMMARY OF THE INVENTION

An aspect of the present invention is to provide a driving unit comprising a first motor and a second motor, the two motors being mechanically coupled to a transmission unit. The two motors transmit motion and torque to two wheels in a characteristic fashion, whereby the motion and torque of each motor transmits rolling to one wheel and, simultaneously, steering to the common axis of the two wheels. In a preferred embodiment, at least two such driving units are used in a rolling vehicle and are operated under computer control. Advantageously, the invention allows a rolling vehicle driven by such a device to remain stationary upon a reorientation of the dual-wheel common axis. This is particularly useful when the rolling vehicle is used in constrained spaces such as narrow passages and hospital areas, amongst others.

In a non-limiting example of implementation of this aspect of the present invention, the first motor and the second motor are of the same type. In other words, their power characteristics and their controllers are essentially the same.

In another non-limiting example of implementation of this aspect of the present invention, the transmission unit comprises a first planetary gear train, a second planetary gear train and a planet carrier connecting the first planetary gear train and the second planetary gear train. Each of the gear trains comprises a series of helical or spur gears with helical gears being preferred.

In this non-limiting example of implementation, the transmission of motion and torque from each motor to each planetary gear train may comprise a belt-pulley mechanism. Alternatively, the transmission of motion and torque from each motor to each planetary gear train may comprise a cam-roller mechanism.

Alternatively, the transmission unit can be driven by a harmonic drive motor or a series of harmonic drive motors.

Another aspect of the present invention is to provide a rolling vehicle with a having a driving unit of the type described above allowing the rolling vehicle to be driven and steered. In a non-limiting implementation, the rolling vehicle may be a terrestrial vehicle, a wheeled robot, or a moving platform, amongst others.

In a non-limiting example of implementation of this aspect of the present invention, the rolling vehicle may comprise a plurality of driving units. Advantageously, by providing a plurality of driving units, the rolling vehicle can drive and steer heavier loads than with a single driving unit. In a non-limiting example of implementation, the rolling vehicle comprises two or more driving units.

Another aspect of the present invention is to provide transmission units for use in rolling vehicles.

In a non-limiting example of implementation of this aspect of the present invention, the transmission unit is used in two-wheel units of rolling vehicles and comprises planar gears, preferably of the helical type. Advantageously, the use of planar helical gears provides for a smooth, low-friction operation at a generally lower cost than that of bevel gears.

In another non-limiting example of implementation of this aspect of the present invention, the transmission unit for rolling vehicles balances the loads on two motors by providing for a layout allowing the even distribution of loads on the two motors.

In another non-limiting example of implementation of this aspect of the present invention, the transmission unit makes use of the power of its two motors for steering and driving each of the two wheels.

In another non-limiting example of implementation of this aspect of the present invention, the transmission unit limits gyroscopic moments of the transmission by reducing the total moment of inertia of parts rotating about horizontal axes.

In another non-limiting example of implementation of this aspect of the present invention, the transmission unit drives and steers wheels that are on the ground, where the transmission unit has a speed reduction relying on two planetary gear trains that are coupled by means of a common planet carrier.

Further, as will be understood by one of skill in the art upon reading this disclosure, other aspects of this invention relate to driving units, rolling vehicles and transmission units comprising all of the above, but which may use alternative means of uniform velocity transmission between essentially parallel axes, different from gears, e.g., belt-pulley mechanisms and cam-roller mechanisms.

Other aspects and features of the present invention will become apparent to those ordinarily skilled in the art upon review of the following description of specific embodiments of the invention in conjunction with the accompanying figures.

DETAILED DESCRIPTION OF THE INVENTION

The present invention relates generally to driving units, rolling vehicles comprising these driving units and transmission units for use in these driving units.

Figure 1:
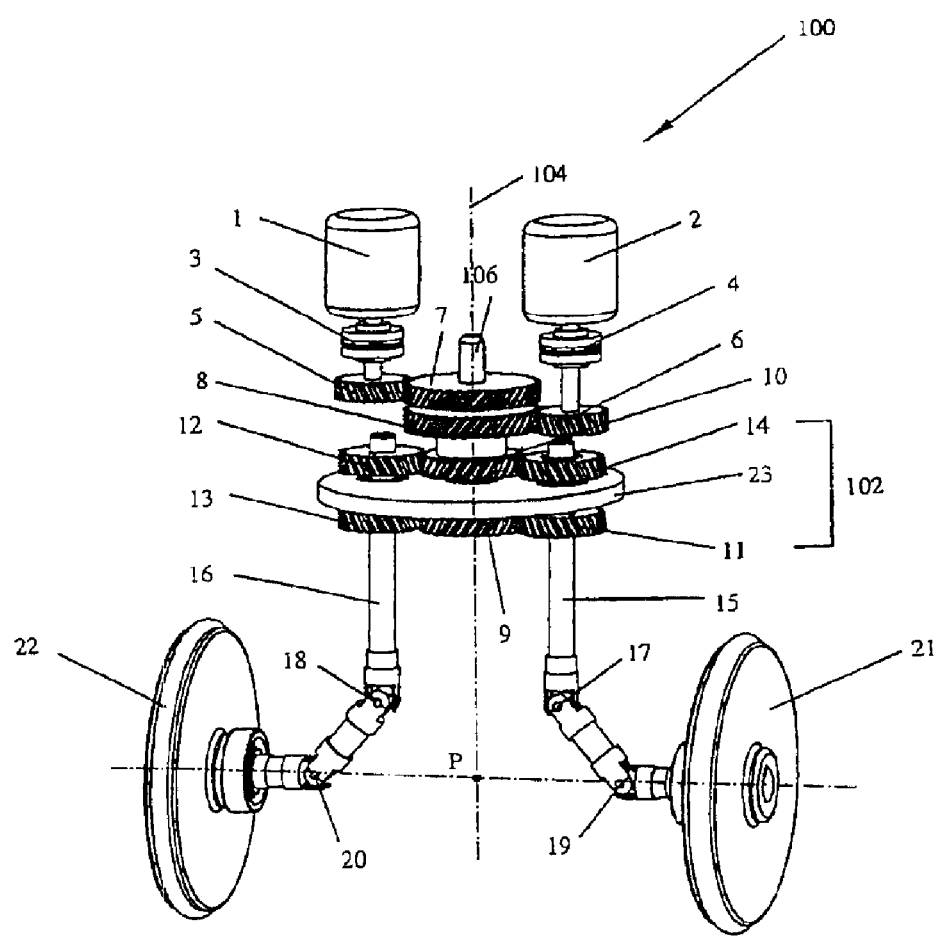
FIG. 1 is a perspective view of one embodiment of a driving unit (with its casing removed) of the present invention wherein the transmission unit comprises a series of helical gears.

FIG. 1 provides a layout of a driving unit 100 in accordance with a non-limiting example of implementation of the invention. In this embodiment, the driving unit 100 comprises a series of interconnected modules for transmitting torque and motion from the motors to the wheels. Thus, as depicted in FIG. 1, driving unit 100 comprises a first wheel 21, a second wheel 22, a first motor 1, a second motor 2 and a transmission unit 102. The first motor 1 and the second motor 2 are mechanically coupled to transmission unit 102. The transmission unit 102 is adapted for establishing a driving relationship between the first motor 1 and first wheel 21 and for establishing a driving relationship between the second motor 2 and second wheel 22. In a preferred embodiment, the transmission unit 102 balances the loads of the two motors by providing for a layout allowing the even distribution of loads on the two motors. The transmission unit 102 of the present invention is pivotable about a steering axis 104.

However, the person skilled in the art will readily appreciate that routine changes in the foregoing array can be implemented so as to adapt the transmission for establishing a driving relationship between the first motor 1 and the second wheel 22 and between second motor 2 and first wheel 21. The coupling between the first motor 1 and second motor 2 and the transmission unit allows the transmission unit 102 to pivot about the steering axis 104 without causing a corresponding pivotable movement of the first motor 1 and second motor 2, while allowing the first motor 1 and second motor 2 to transmit power to their respective wheels 21 and 22. Accordingly, in this preferred embodiment, the transmission unit limits gyroscopic moments of the transmission by reducing the total moment of inertia of parts rotating about the horizontal axes.

Figure 2:
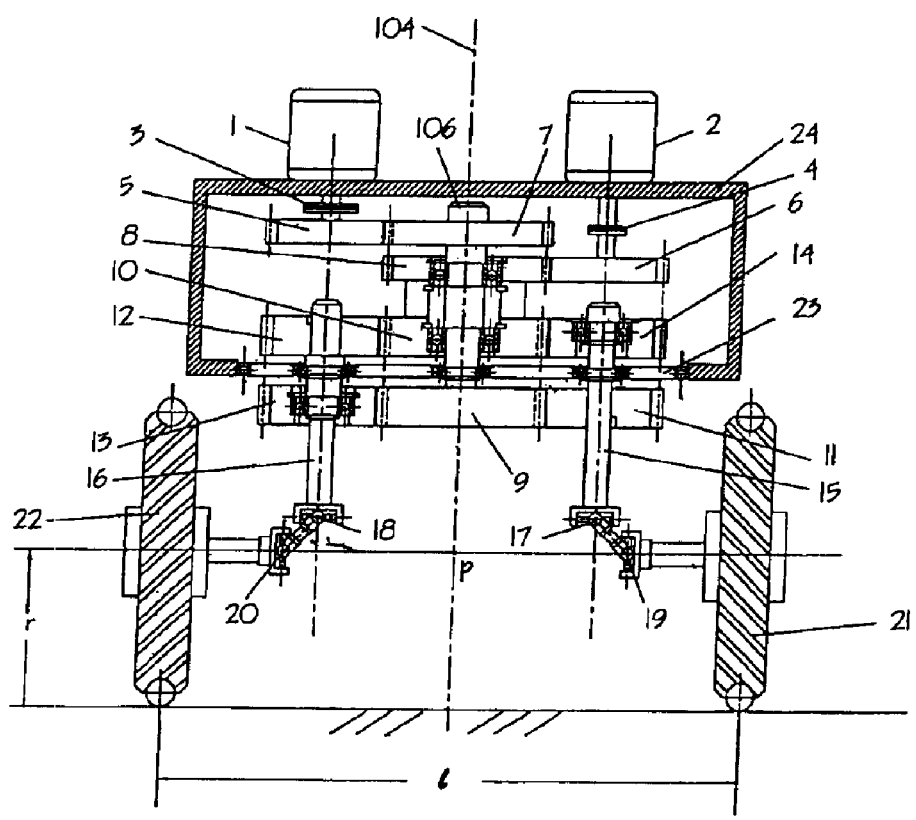
FIG. 2 is a front cross-sectional view of the embodiment of the driving unit depicted in FIG. 1.

As can be seen in FIG. 1 and the cross-sectional view of this exemplary driving unit depicted in FIG. 2, the first wheel 21 is connected through two universal joints 17 and 19, to a first shaft 15, and second wheel 22 is connected through two universal joints 18 and 20, to a second shaft 16. In alternative embodiments, the first and second shafts 15 and 16 may be coupled to the wheels 21 and 22, respectively, by other suitable joint means including, but not limited to, bevel gears or worm gears.

As shown in FIGS. 1 and 2, a pinion 5 is rigidly mounted to a shaft beneath the first motor 1 by means of a coupling 3. Similarly, a pinion 6 is rigidly mounted to a shaft beneath the second motor 2 by means of a coupling 4. The teeth of pinion 5 mesh with the teeth of a corresponding helical gear 7, which is part of the transmission unit 102. The teeth of pinion 6 mesh with the teeth of corresponding helical gear 8, which is also a part of transmission unit 102. It is through the contact between pinion 5 and helical gear 7 that the first motor 1 is mechanically coupled to transmission unit 102. It is through the contact between pinion 6 and helical gear 8 that the second motor 2 is mechanically coupled to transmission unit 102.

The transmission unit 102 comprises a central shaft 106 that is aligned coaxially with steering axis 104. Helical gear 7 and a sun gear 9 are rigidly mounted to the central shaft 106. A cylindrical sleeve 108 surrounds at least a portion of the central shaft 106 and is also aligned coaxially with steering axis 104. Helical gear 8 and a sun gear 10 are rigidly mounted to the cylindrical sleeve 108.

Figure 3A:
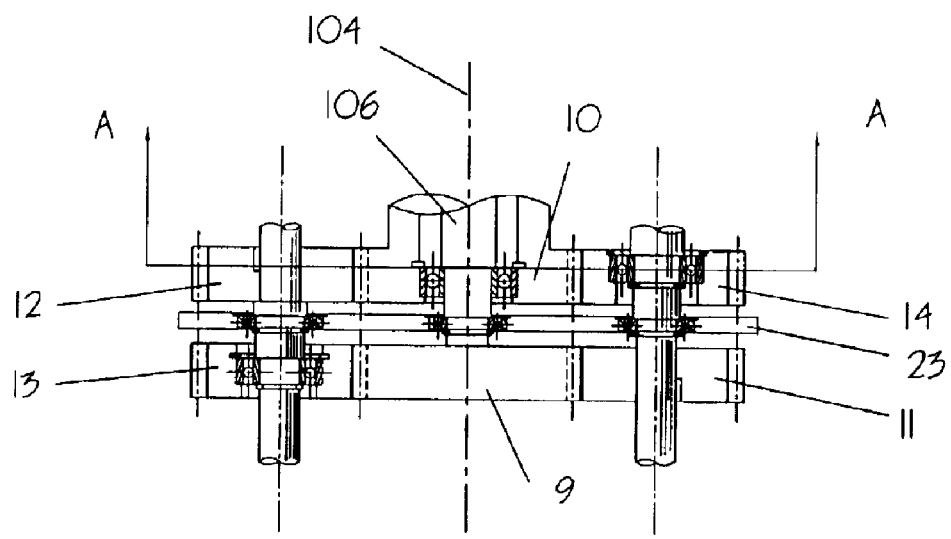
FIG. 3a is a view of the double planetary mechanism of the transmission device of the embodiment of the driving unit depicted in FIG. 1 and showing line A—A.
Figure 3B:
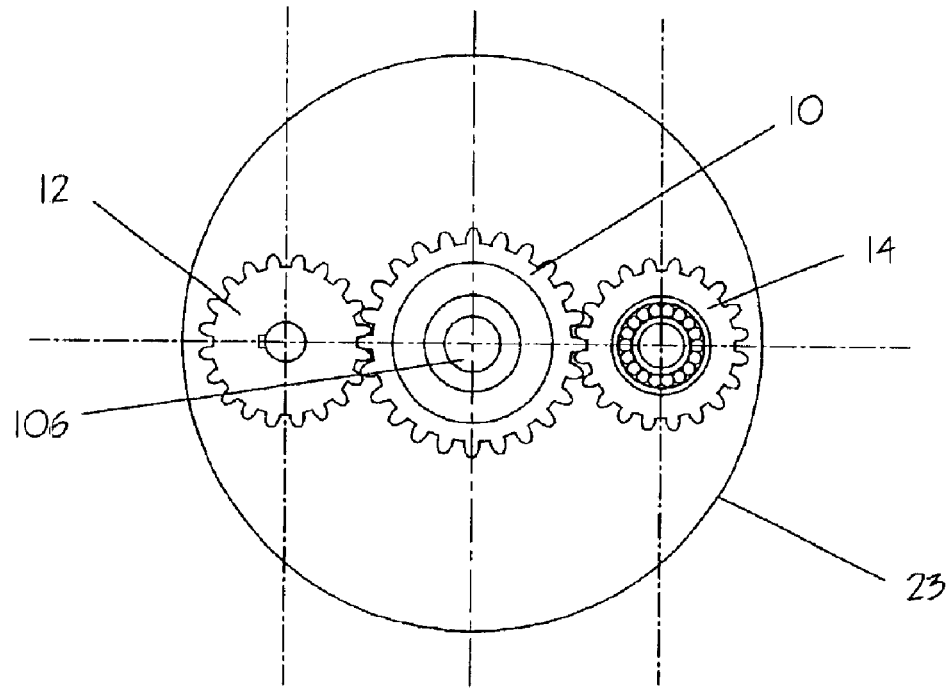
FIG. 3b is a top planar view of the upper train of the double planetary mechanism depicted in FIG. 3a bisected along line A—A.

In this embodiment, the transmission unit 102 further comprises two planetary gear trains, preferably positioned at two different levels as depicted in greater detail in FIGS. 3a, 3b, 4a and 4b. Each planetary gear train preferably comprises two diametrically-opposed planet gears turning at the same angular velocity, one planet gear of which transmits motion to a first shaft of the driving unit to which it is rigidly attached, the second planet gear idling with respect to a second shaft of the driving unit or vice versa. This embodiment of the transmission unit has a speed reduction that relies on the two planetary gear trains that are coupled by means of a common planet carrier. Further, this embodiment of transmission unit provides even actuation of the two coaxial wheels of the driving unit of the rolling vehicle without slipping on a flat surface. The upper planetary gear train of the transmission unit comprises a sun gear 10 and a first and second planet gear 12 and 14, respectively. As can be seen in FIGS. 2 and 3b, second planet gear 14 is non-rigidly mounted to first shaft 15 by means such as bearings, and first planet gear 12 is rigidly mounted to second shaft 16. Motion from second motor 2 is transmitted to second wheel 22 through this upper planetary gear train. When second motor 2 causes its associated shaft to rotate, pinion 6 rotates, thereby causing helical gear 8 to rotate. This in turn causes sun gear 10 to rotate, which causes first and second planet gears 12 and 14, respectively, to rotate as well. Since first planet gear 12 is rigidly mounted to second shaft 16, second shaft 16 is caused to rotate at the same rate as first planet gear 12. This rotational movement is transmitted to second wheel 22 through universal joints 18 and 20.

The lower planetary gear train comprises sun gear 9 and third and fourth planet gears 11 and 13, respectively. As can be seen in FIGS. 2 and 4b, fourth planet gear 13 is non-rigidly connected to second shaft 16 through means such as bearings and third planet gear 11 is rigidly connected to first shaft 15. Motion from first motor 1 is transmitted to first wheel 21 through this lower planetary gear train. When first motor 1 causes its associated shaft to rotate, pinion 5 rotates, thereby causing helical gear 7 to rotate. This in turn causes sun gear 9 to rotate, which causes third and fourth planet gears 11 and 13, respectively, to rotate as well. Since only third planet gear 11 is rigidly connected to first shaft 15, first shaft 15 is caused to rotate, which in turn transmits this rotational movement to first wheel 21 through universal joints 17 and 19.

Positioned between the upper planetary gear train and the lower planetary gear train is a planet carrier 23, which contributes to the steering motion of the driving unit 100. More specifically, the planet carrier 23 translates the average of the rotational speeds of the first motor 1 and the second motor 2, into steering of the driving unit 100. Planet carrier 23 has a first bore through which second shaft 16 extends and a second bore through which first shaft 15 extends. Planet carrier 23 is pivotable about the steering axis 104.

The combination of the two planetary gear trains as well as the planet carrier 23 allows the transmission unit 102 to pivot about steering axis 104, thereby steering the first wheel 21 and the second wheel 22, without causing the platform 24 on which first motor 1 and second motor 2 are fixedly mounted to pivot about the steering axis 104.

As discussed supra, and with further reference to FIGS. 3a and 3b, the first planet gear 12 is rigidly mounted on the second shaft 16, which thus turns at the rate of the first planet gear 12. However, its companion, second planet gear 14, is non-rigidly mounted to first shaft 15 by means such as bearings, and hence, the second planet gear 14 and the first shaft 15 turn at independent rates. Accordingly, the second planet gear 14 essentially idles with respect to the second shaft 16 of the driving unit.

Figure 4A:
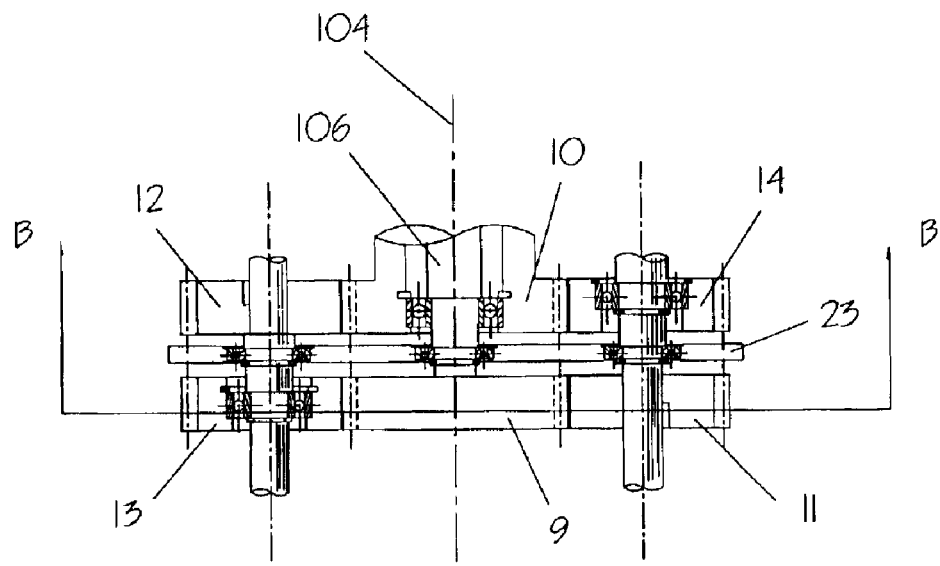
FIG. 4a is a view of the double planetary mechanism of the transmission device of the embodiment of the driving unit depicted in FIG. 1 showing line B—B.
Figure 4B:
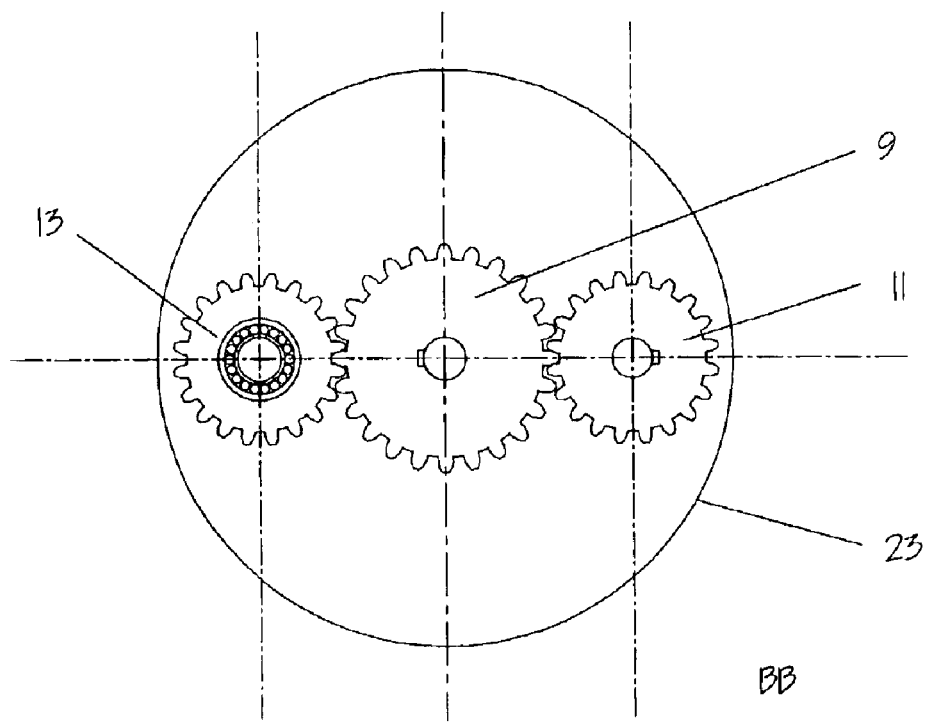
FIG. 4b is a top planar view of the lower train of the double planetary mechanism depicted in FIG. 4a bisected along line B—B.

Also discussed supra, and with further reference to FIGS. 2, 4a and 4b, the third planet gear 11 is rigidly mounted on the second shaft 15, which thus turns at the rate of the third planet gear 11. However, its companion, fourth planet gear 13, is non-rigidly mounted to second shaft 16 by means such as bearings, and hence the fourth planet gear 13 and second shaft 16 turn at independent rates. Accordingly, the fourth planet gear 13 essentially idles with respect to the first shaft 15 of the driving unit.

In a preferred embodiment, the planetary trains of this transmission unit may further comprise a mechanism for uniform speed transmission between parallel shafts of the driving unit. Examples of such mechanisms include, but are not limited to, a belt-pulley or a series of belt-pulleys, cycloid wheels and cams and rollers.

FIG. 2 shows the transmission of torque and motion from the first and second shafts 15 and 16, respectively, by means of an array of universal joints 17 and 19 and 18 and 20, respectively, at angles of 45°. The specific example of implementation shown in FIGS. 1 and 2 contemplates the torque and motion transmission from a vertical axis to a horizontal axis by means of these two sets of universal joints. However, the person skilled in the art, upon reading this disclosure, will readily appreciate that this transmission can be realized by alternative means, such as bevel gears and worm-gears amongst others, without detracting from the spirit of the invention.

Further, in an alternative embodiment, the bends provided by the universal joints 17 and 18 and their respective companions 19 and 20 can be reversed so that first wheel 21 and second wheel 22 are closer to the midpoint P of FIGS. 1 and 2.

FIGS. 1 and 2 depict conventional wheels with a shape indicative of point contact with the ground, as needed for the accurate position control of a vehicle driven by a driving unit of the present invention. However, in applications where accurate positioning of the vehicle is not a priority, contact between the wheels and the ground over a larger area may be acceptable. Thus, in this case, alternative wheels such as pneumatic tires may be used.

The relationship among the angular velocities of all moving elements of the driving unit of the present invention is described infra, with the aid of the following notation:

$N_i$: number of teeth of gear number i, for i=gears 5, 6, 7, 8, 9, 10, 11, 12, 13, and 14 of FIG. 1;

$r_{68}=N_6/N_8$, the gear ratio between gears 6 and 8 of FIG. 1;

$\omega_i$: angular velocity of $i^{th}$ rotating element, a gear, the platform 24 on which the motors are fixedly mounted, or the planet carrier 23;

v: scalar velocity of point P of FIGS. 1 and 2, defined therein as the intersection of the transmission axis 104 and the common axis of the first and second wheels 21 and 22, respectively;

l=distance between the wheel-ground contact points;

r=radius of the wheels; and $\rho=r/l$: ratio of the wheel radius to the distance between contact points.

In a preferred embodiment such as exemplified herein, it is assumed that the gear ratio $N_5/N_7$ is equal to $N_6/N_8$, i.e., $N_5/N_7=r_{68}$, but this relation in no way limits the present invention; alternative relations can be readily accommodated, as needed.

As is common practice in the art, the relative angular velocities of rotating element i with respect to another element j are denoted by $\omega_{i/j}$. More specifically, relative angular velocities of rotating element i are referred to with respect to two key elements of the transmission 100, the planet carrier 23 and the platform 24 on which the first motor 1 and the second motor 2 are fixedly mounted. These relative angular velocities are thus denoted by $\omega_{i/23}$ and $\omega_{i/24}$, respectively. Absolute angular velocities are understood henceforth with respect to ground, a common practice in the art.

The analysis that follows is intended to find relations between the angular velocities of the wheels and those of the motors. The person skilled in the art will readily appreciate that all gears and planet carrier undergo planar motion and, hence, their angular velocities need not be treated as vectors, their scalar nature sufficing for purposes of this analysis. However, the two wheels undergo three-dimensional motion, with their axes remaining horizontal. This means that their vector angular velocities can be decomposed into one single horizontal component and one vertical component. The latter is common to the first and second wheels 21 and 22, and identical with the scalar angular velocity of the planet carrier 23; the former is different for each wheel. The horizontal angular velocity of first wheel 21 is $\omega_{12/23}$, that of second wheel 22 being $\omega_{11/23}$. The important velocities to relate in this regard are thus $\omega_{23}$, $\omega_{11/23}$, and $\omega_{12/23}$. Two more relevant velocities to relate with the foregoing velocities are the angular velocity of the platform 24, $\omega_{24}$, and the velocity v of point P of FIGS. 1 and 2.

The theory of machines and mechanisms teaches that the ratio of the relative angular velocities of two gears with respect to the frame on which their axes are mounted is the negative reciprocal of the ratio of their number of teeth, when the two gears are external to each other. With reference to the pinion 6 and its meshing gear 8, both with axes mounted on the platform 24, $$\frac{\omega_{8/24}}{\omega_{6/24}} = -\frac{N_6}{N_8} \text{ whence,} \qquad \text{Equation 1}$$

$$\frac{\omega_8 - \omega_{24}}{\omega_6 - \omega_{24}} = -r_{68} \qquad \text{Equation 2}$$

Subtracting and adding the same quantity $\omega_{23}$ to the numerator and denominator of the foregoing rational expression does not alter Equation 2, i.e., $$\frac{\omega_8 - \omega_{23} - (\omega_{24} - \omega_{23})}{\omega_6 - \omega_{23} - (\omega_{24} - \omega_{23})} = -r_{68} \qquad \text{Equation 3}$$

Relative velocities with respect to the planet carrier 23 are readily identified in the numerator and denominator of the above rational expression, and hence, $$\frac{\omega_{8/23} - \omega_{24/23}}{\omega_{6/23} - \omega_{24/23}} = -r_{68} \qquad \text{Equation 4}$$

After solving for $\omega_{8/23}$ from Equation 4, and rearranging terms, Equation 5 is obtained $$\omega_{8/23}=\omega_{24}-\omega_{23}-r_{68}\omega_{6/24} \qquad \text{Equation 5}$$

The counterpart relation for the lower planetary gear train is $$\omega_{7/23}=\omega_{24}-\omega_{23}-r_{68}\omega_{5/24} \qquad \text{Equation 6}$$

Moreover, since gears 7 and 9 are rigidly mounted on the same shaft, their angular velocities are identical, and hence, $$\omega_{7/23}=-r_{68}\omega_{11/23} \qquad \text{Equation 7}$$

The above relation, as pertaining to the upper planetary gear train, is $$\omega_{8/23}=-r_{68}\omega_{12/23} \qquad \text{Equation 8}$$

Substitution of Equations 7 and 8 into Equations 6 and 5, respectively, leads, after routine simplifications, to $$\omega_{11/23} = \omega_{5/24} - \frac{1}{r_{68}}(\omega_{24} - \omega_{23}) \text{ and} \qquad \text{Equation 9}$$

$$\omega_{12/23} = \omega_{6/24} - \frac{1}{r_{68}}(\omega_{24} - \omega_{23}) \qquad \text{Equation 10}$$

Furthermore, under the assumption that the two wheels roll without slipping or skidding, the angular velocity of the common wheel axis, which is identical to that of the planet carrier 23, is given by $$\omega_{23}=\rho(\omega_{12/23}+\omega_{11/23}) \qquad \text{Equation 11}$$

while the velocity of point P is given by $$v = \frac{r}{2}(\omega_{12/23} - \omega_{11/23})  \quad \text{Equation 12}$$

In Equations 11 and 12 the reversal is considered in the sense of the angular velocities of the wheels, caused by the opposite bend of the two wheel axes, as produced by the double array of universal joints.

Solving for the horizontal components of the wheel angular velocities, $\omega_{11/23}$ and $\omega_{12/23}$, from Equations 11 and 12 yields $$\omega_{11/23} = \frac{1}{2\rho}\omega_{23} + \frac{v}{r} \text{ and} \quad \text{Equation 13}$$

$$\omega_{12/23} = \frac{1}{2\rho}\omega_{23} - \frac{v}{r} \quad \text{Equation 14}$$

The conversion of the motor relative angular velocities with respect to the platform 24, under the assumption that information on the absolute angular velocities of the platform and the planet carrier is available, into the horizontal components of the angular velocities of the wheels, as stated in Equations 9 and 10, is enabled by means of computer control. The inverse relations, providing the motor relative angular velocities with respect to the platform 24 in terms of the required horizontal and vertical components of the wheel angular velocities and the platform angular velocity, are readily derived from the same equations, namely, $$\omega_{5/24} = \omega_{11/23} + \frac{1}{r_{68}}(\omega_{24} - \omega_{23}) \text{ and} \quad \text{Equation 15}$$

$$\omega_{6/24} = \omega_{12/23} + \frac{1}{r_{68}}(\omega_{24} - \omega_{23}) \quad \text{Equation 16}$$

The coordination of a plurality of dual-wheel units, by means of computer control as well, allows the realization of arbitrary maneuvers of the vehicle platform. The number of units can vary, but if a platform is to be driven with three degrees of freedom, in x, y, and θ, then a minimum of three wheel units is required, so as to provide for a mobility of three.

The above-described process for computing the angular velocities $\omega_{5/23}$ and $\omega_{6/23}$, as provided by the motors 1 and 2 of a driving unit of the present invention, can be implemented on a general-purpose digital computer. The digital computer also provides an I/O interface for sending control signals to motors 1 and 2 in order to control their angular velocities $\omega_{5/23}$ and $\omega_{6/23}$, then converted by gear 5 and 7 and 6 and 8, respectively, into angular velocities $\omega_{7/23}$ and $\omega_{8/23}$, thereby controlling the driving and steering of a dual-wheel unit.

Alternatively, the above-described process for computing the angular velocities $\omega_{5/23}$ and $\omega_{6/23}$ of the motors 1 and 2 can be implemented on a dedicated hardware platform where electrical/optical components implement the computations described in the specification. It will be readily appreciated that the hardware platform is not a limiting component of the invention.

Although the present invention has been described in considerable detail with reference to certain preferred embodiments thereof, variations and refinements are possible without departing from the spirit of the invention. For example, in the above non-limiting example of implementation of the driving unit, the first motor and the second motor are of the same type. In other words, their power characteristics and their controllers are essentially the same. However, in other embodiment, the first and second motors may have different power characteristics and/or their controllers may be different.

Further, the transmission unit described supra, comprises a series of helical gears (see FIG. 1). Advantageously, the use of planar helical gears provides for a smooth, low-friction operation at a generally lower cost than that of bevel gears. However, spur gears may be routinely substituted therein. Further, transmission of motion and torque from each motor to each planetary gear train may comprise an alternative means such as a series of belt-pulley mechanisms or a series of cam-roller mechanisms. In yet another embodiment, the transmission unit can be driven by a series of harmonic drive motors.

The present invention also relates to rolling vehicles comprising a driving unit of the type described supra which allows the rolling vehicle to be driven and steered. Examples of such rolling vehicles include, but are not limited to terrestrial vehicles, wheeled robots, and moving platforms. In a preferred embodiment of the present invention, the rolling vehicle comprises at least two of the driving units of the present invention. Rolling vehicles comprising two or more driving units can drive and steer heavier loads than those with a single driving unit.

The scope of the invention should be limited only by the appended claims and their equivalents.

What is claimed is:

1. A driving unit for use with a rolling vehicle, said driving unit comprising:
   (a) a first motor;
   (b) a first wheel driven by said first motor
   (c) a second motor;
   (d) a second wheel driven by said second motor; and
   (e) a transmission unit which mechanically couples said first motor to said first wheel and said second motor to said second wheel thereby allowing said first motor and said second motor to transmit power to said first wheel and said second wheel, respectively, said transmission unit being pivotable about a steering axis of the driving unit without causing a corresponding pivotable movement of said first motor and said second motor.

2. The driving unit of claim 1 wherein said transmission unit comprises
   (a) a first planetary gear train;
   (b) a second planetary gear train; and
   (c) a planet carrier connecting said first planetary gear train and said second planetary gear train.

3. The driving unit of claim 2, wherein said first and second planetary gear trains comprise a series of helical or spur gears.

4. The driving unit of claim 1, wherein said transmission unit comprises a series of harmonic drive motors.

5. A driving unit for a rolling vehicle, said driving unit comprising:
   (a) a first shaft;
   (b) a second shaft;
   (c) a first wheel connected to said first shaft;
   (d) a second wheel connected to said second shaft;
   (e) a first motor;
   (f) a second motor; and
   (h) a transmission unit which mechanically couples said first motor to said first wheel and said second motor to said second wheel thereby allowing said first motor and said second motor to transmit power to said first wheel and said second wheel, respectively, said transmission unit comprising:
(i) a central shaft;
(ii) a sleeve surrounding at least a portion of said central shaft, said sleeve adapted to move independently from said central shaft;
(iii) a first gear train comprising a first sun gear, a first planet gear and a second planet gear, said sun gear being rigidly connected to said central shaft, said first planet gear rigidly connected to said second shaft and said second planet gear non-rigidly connected to said first shaft;
(iv) a second gear train comprising a second sun gear, a third planet gear and a fourth planet gear, said second sun gear being rigidly connected to said sleeve, said third planet gear rigidly connected to the first shaft and said fourth planet gear non-rigidly connected to said second shaft;
(v) a planet carrier positioned between said first gear train and said second gear train, said planet carrier having a first bore and a second bore wherein said first shaft extends through said first bore and wherein said second shaft extends through said second bore;
wherein the mechanical coupling between the first motor and second motor and the transmission unit allows the transmission unit to pivot about its central shaft without causing a corresponding pivotable movement of said first motor and said second motor.

6. A rolling vehicle comprising the driving unit of any of claims 1 through 5.

7. The rolling vehicle of claim 6 wherein the vehicle comprises at least two of said driving units.

8. A transmission unit comprising two planetary gear trains connected by a planet carrier wherein each planetary gear train comprises two diametrically-opposed planet gears turning at the same angular velocity, one planet gear of which transmits motion to a shaft of the driving unit to which it is rigidly attached, the second planet gear idling with respect to a second shaft of the driving unit.

* * * * *